(12) United States Patent
Jarisch et al.

(10) Patent No.: US 10,675,596 B2
(45) Date of Patent: Jun. 9, 2020

(54) FLUID FOAMING MACHINE

(71) Applicant: NESTEC S.A., Vevey (CH)

(72) Inventors: Christian Jarisch, Lutry (CH); Nicolas Camier, Brignais (FR)

(73) Assignee: Societe des Produits Nestle S.A., Vevey (CH)

( * ) Notice: Subject to any disclaimer, the term of this patent is extended or adjusted under 35 U.S.C. 154(b) by 221 days.

(21) Appl. No.: 15/741,325

(22) PCT Filed: Jun. 22, 2016

(86) PCT No.: PCT/EP2016/064337
§ 371 (c)(1),
(2) Date: Jan. 2, 2018

(87) PCT Pub. No.: WO2017/005487
PCT Pub. Date: Jan. 12, 2017

(65) Prior Publication Data
US 2018/0193807 A1      Jul. 12, 2018

(30) Foreign Application Priority Data

Jul. 3, 2015   (EP) ................................. 15175199

(51) Int. Cl.
*A47J 31/44*      (2006.01)
*A47J 31/60*      (2006.01)
*B01F 3/04*       (2006.01)
*B01F 15/06*      (2006.01)

(52) U.S. Cl.
CPC .......... *B01F 3/04446* (2013.01); *A47J 31/44* (2013.01); *A47J 31/441* (2013.01); *A47J 31/4403* (2013.01); *A47J 31/4485* (2013.01); *A47J 31/60* (2013.01); *B01F 3/04992* (2013.01); *B01F 15/063* (2013.01); *B01F 15/065* (2013.01); *B01F 2003/04936* (2013.01); *B01F 2015/061* (2013.01); *B01F 2015/062* (2013.01); *B01F 2215/0006* (2013.01)

(58) Field of Classification Search
CPC .......... A47J 31/4485; A47J 31/60; B01F 3/04
USPC .......................................... 99/280
See application file for complete search history.

(56) References Cited

U.S. PATENT DOCUMENTS 9,320,384 B2 *   4/2016   Remo ..................... A47J 31/60

FOREIGN PATENT DOCUMENTS

| AU | 646379     | 2/1994  |
| EP | 0803219    | 10/1997 |
| WO | 2005013781 | 2/2005  |
| WO | 2011015963 | 2/2011  |

* cited by examiner

*Primary Examiner* — Robert A Hopkins
(74) *Attorney, Agent, or Firm* — K&L Gates LLP

(57) ABSTRACT

The invention refers to a fluid foaming machine (100) for producing foam comprising a fluid container (30) where the fluid is arranged, and a foaming device (40) through which fluid flows and is heated and/or foamed, the machine (100) further comprising at least a cooling unit configured to maintain permanently refrigerated both the fluid container (30) and the foaming device (40) during fluid preparation and during stand-by of the machine (100).

12 Claims, 12 Drawing Sheets

FLUID FOAMING MACHINE

CROSS REFERENCE TO RELATED APPLICATIONS

The present application is a National Stage of International Application No. PCT/EP2016/064337, filed on Jun. 22, 2016, which claims priority to European Patent Application No. 15175199.7, filed on Jul. 3, 2015, the entire contents of which are being incorporated herein by reference.

FIELD OF THE INVENTION

The present invention relates to a fluid foaming machine, particularly to a milk foaming machine, able to provide chilled, cold, ambient or hot milk foam, the machine being very easy to clean and providing an extremely simplified handling.

BACKGROUND OF THE INVENTION

Milk foaming machines already exist for a long time, being able to provide hot milk foams. These known machines use different types of foaming, heating and milk storing solutions. Professional milk foaming machines used in business applications are frequently used along the day: they typically comprise a metallic milk container, preferably made in stainless steel, where milk is stored and is kept refrigerated at a temperature typically of around 4° C. in order to correctly and hygienically preserve it until it is going to be used and delivered as milk foam. The problem is that, at the beginning of the day, milk is effectively at a low temperature of 4° C. but, as the day goes by, milk temperature increases and, either the container needs to be removed and stored in the fridge for some time, or milk temperature increases above the allowable limit (typically stablished at around 15° C.): in the first case, the system is not friendly for the user and, in the second case, hygiene problems may arise. Other solutions provide these machines with a compressor that keeps continuously refrigerated the milk container.

In these known milk foaming machines, milk is sucked through a flexible pipe and the air needed for foaming is provided through an air valve: the mixture of milk and air then typically flows through a labyrinth passage where it is foamed. Heating of the foam can be achieved by injecting steam into the mixture, in order to heat it. The problem of these known systems is that the parts (typically pipes or ducts) through which milk and air and steam are delivered need to be either made disposable, so that they are kept hygienic, but therefore provide a costly solution and not of friendly use, or if made cleanable, their cleaning is highly complicated.

Therefore, current known solutions in the state of the art have serious disadvantages in terms of user friendliness, handling and cleaning. As explained, typical professional solutions have a milk fridge (milk container that is kept refrigerated), a milk fluid system, optionally a milk heating system and a foaming device. All these existing solutions have the milk fluid system, the heating and the foaming device outside the refrigerated area, needing complex cleaning procedures after each foam preparation or at least after each day of use.

Document US 2004/0241297 A1 for example discloses a device for production and application of whipped cream: this device comprises a cream container from which liquid cream is supplied through a suction line into a foaming device from which foam is provided through a nozzle. In this device, only cold or chilled whipped cream can be provided as there are no heating means, and in order to hygienically preserve the cream remaining in the nozzle and/or foaming device between different uses of the machine, the nozzle and outlet head can be retracted after each use into a refrigerated part of the machine. The problem of this device for example is that the user needs to handle this outlet and draw it back to the refrigerated position, after each use. Moreover, once cleaning needs to be done, the suction line needs to be removed and cleaned or disposed, which is either complicated or costly. Moreover, cleaning of the nozzle and outlet is complicated and does not provide satisfactory results.

Therefore, it would be desirable to provide a milk foaming device that allows simplified cleaning (only simplified cleaning of very few parts of the device is needed once a day) and simplified handling, avoiding complex cleaning needed in solutions in the prior art and avoiding any rinsing cycles.

The present invention comes to provide a solution to the above-described needs, as it will be further explained. The invention also aims at other objects and particularly at the solution of other problems as will appear in the rest of the present description.

SUMMARY OF THE INVENTION

According to a first aspect, the invention relates to a fluid foaming machine for producing foam comprising a fluid container where the fluid is arranged, and a foaming device through which fluid flows and is heated and/or foamed. The machine further comprises at least a cooling unit configured to maintain permanently refrigerated both the fluid container and the foaming device during fluid preparation and during stand-by of the machine.

According to a possible embodiment, the fluid foaming machine comprises two distinct cooling units intended to refrigerate the fluid container and the foaming device separately.

Preferably, in the fluid foaming machine of the invention, one cooling unit refrigerates a primary compartment where the fluid container is arranged and another cooling unit refrigerates a cooling block configured to contour and refrigerate the foaming device.

Typically, the primary compartment comprises a cooling block cooperating with a cavity in the fluid container and cooling walls refrigerating the sides of the fluid container.

The fluid foaming machine can further comprise one cooling unit configured to refrigerate a block, the block comprising an inner volume to receive the container and an insert part configured to receive the foaming device.

Preferably, according to the invention, the fluid container and the foaming device are removable from the machine.

Also preferably, the fluid foaming machine comprises a top opening provided with an air entry and a steam entry configured to cooperate with corresponding air and steam entries in the foaming device when the top opening closes over the foaming device.

The fluid foaming machine of the invention preferably further comprises at least one valve to control the air and/or steam entries in the top opening.

Besides, the fluid foaming machine preferably comprises a foaming receiver at least partly shaped complementary to the foaming device so that the foaming device is tightened when arranged into it.

Typically, the fluid container in the fluid foaming machine of the invention comprises a filling inlet through which fluid can be inserted in the container without removing it from the machine. Typically, the fluid container further comprises an integrated guide part intended to receive the foaming device.

Preferably, the fluid foaming machine further comprises heating means to heat the fluid dispensed through the foaming device. Typically, the heating means comprises conduction and/or radiation and/or hot air and/or induction means.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1A:
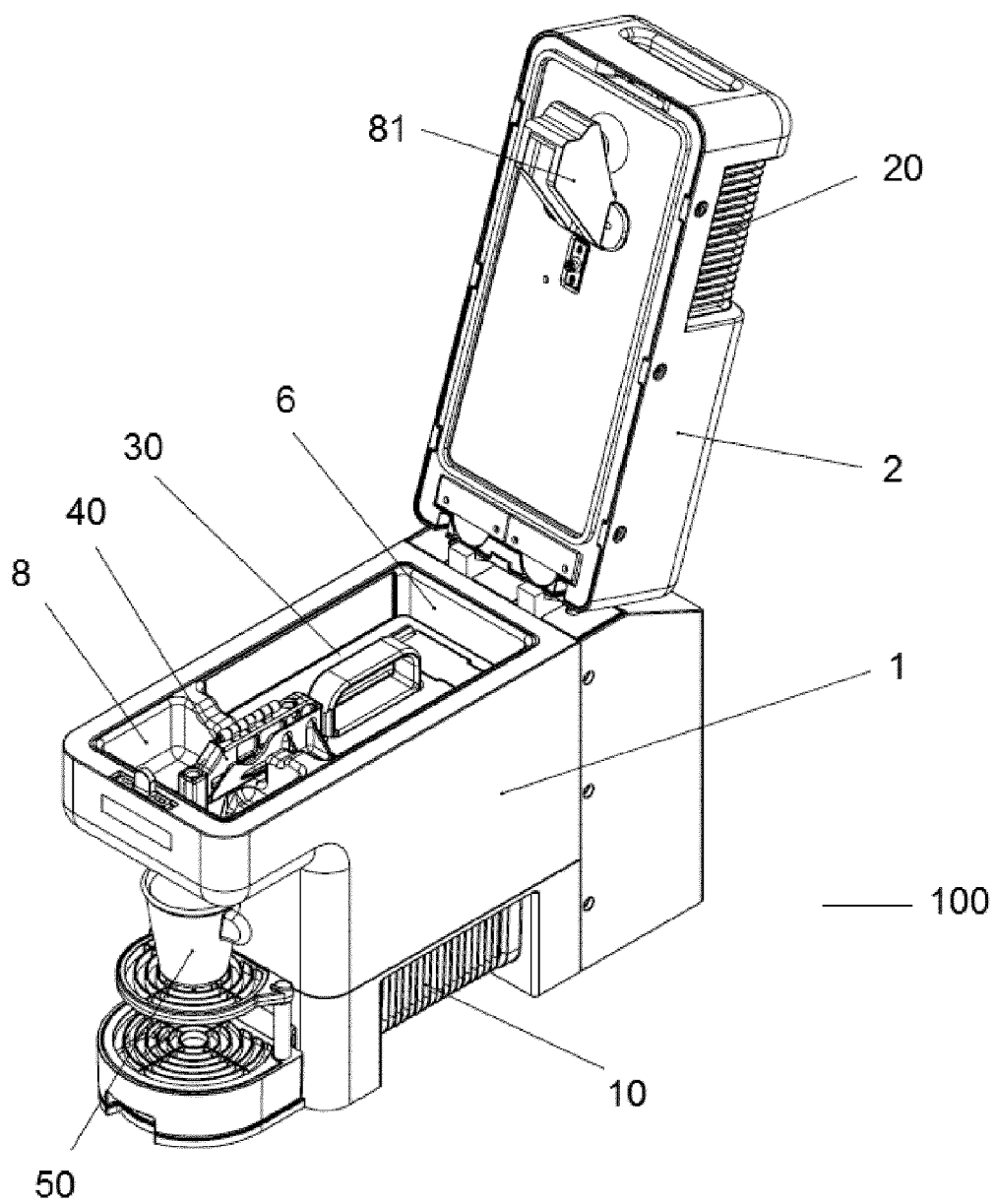
FIGS. 1a-b show views of a fluid foaming machine according to the present invention, in an open position (FIG. 1a) and in a closed position (FIG. 1b).
Figure 1B:
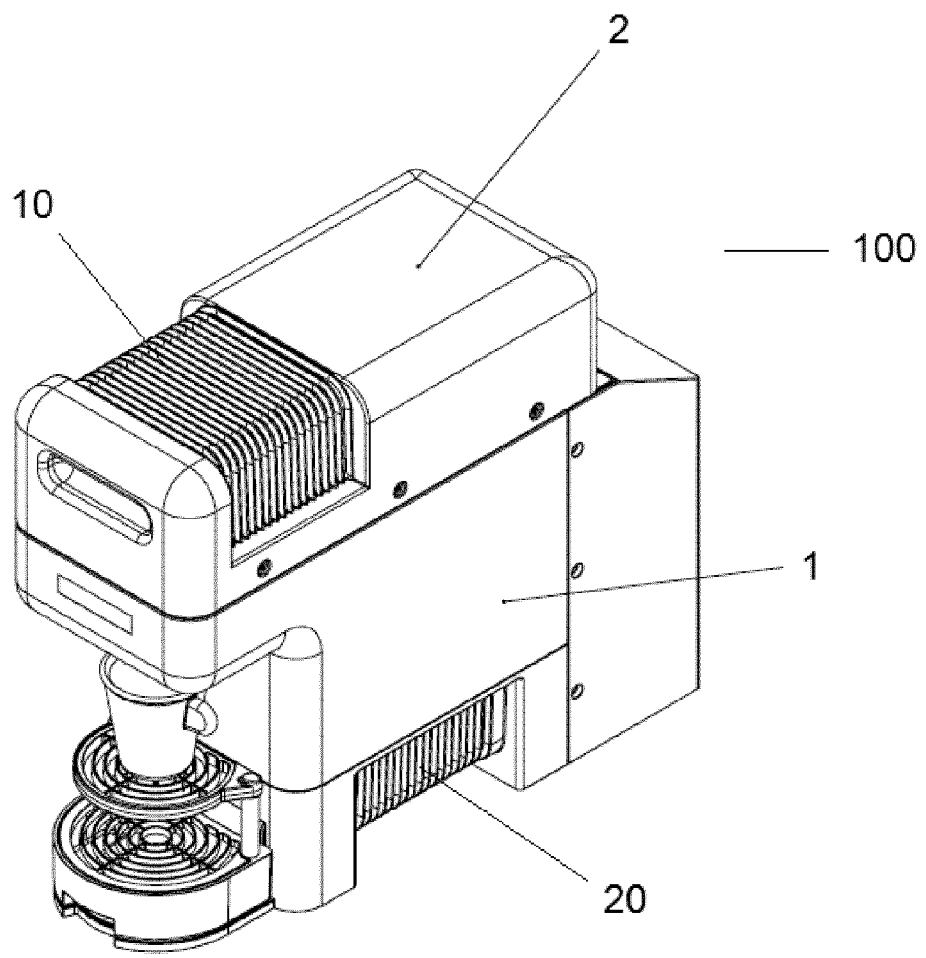

As represented in FIGS. 1a and 1b, the invention relates to a fluid foaming machine 100 able to provide cold, chilled, ambient and/or hot fluid foam. In the following, the description of the present invention is given in view of foaming of milk. However, the invention is not limited to milk as a fluid, but can also be applied to other fluids, e.g. chocolate, coffee, etc. Consequently, other foams different to milk foam can be achieved by the machine of the present invention as well. When talking about milk in the present invention, it should be understood not only pure milk but also milk-based fluids having a major weight proportion of pure milk. Also in the present invention, frothing, foaming or whipping should be understood as synonyms.

Referring now to FIGS. 1a and 1b, a complete fluid foaming machine 100 is represented, shown in an open and a closed position, respectively. As shown in FIG. 1a, the opening of the machine 100 is done on the top, which is particularly advantageous as it reduces the temperature increase of the fluid during filling of it into the fluid container 30. As shown in FIG. 1a, the machine 100 comprises a machine housing 1 having a primary refrigerated compartment 6 where a fluid container 30 can be inserted together with its associated foaming device 40. The foaming device 40 is placed in a secondary refrigerated compartment 8 in order to keep the temperature cold at the fluid outlet. Both primary and secondary refrigerated compartments 6, 8 are accessible via a top opening 2 reducing the cold temperature loss to a minimum. The machine 100 of the invention preferably comprises two separated cooling units: a first cooling unit 10 refrigerating the primary refrigerated compartment 6 where the fluid container 30 is inserted, and a second cooling unit 20 refrigerating the secondary refrigerated compartment 8 in contact with the foaming device 40. According to such embodiment, the fluid is maintained refrigerated when it is stored in the container 30 and until it has actually been foamed and it is delivered through the outlet; therefore, it is maintained refrigerated during all the steps and in all parts of the machine 100 which avoids complex cleaning procedures and any need of rinsing operations as there is no milk that can be damaged and that can remain inside the system. Also as represented in FIG. 1a, the machine 100 of the invention further comprises a dispensing area 50 that adjustable in height and configured for different cup sizes.

Figure 2A:
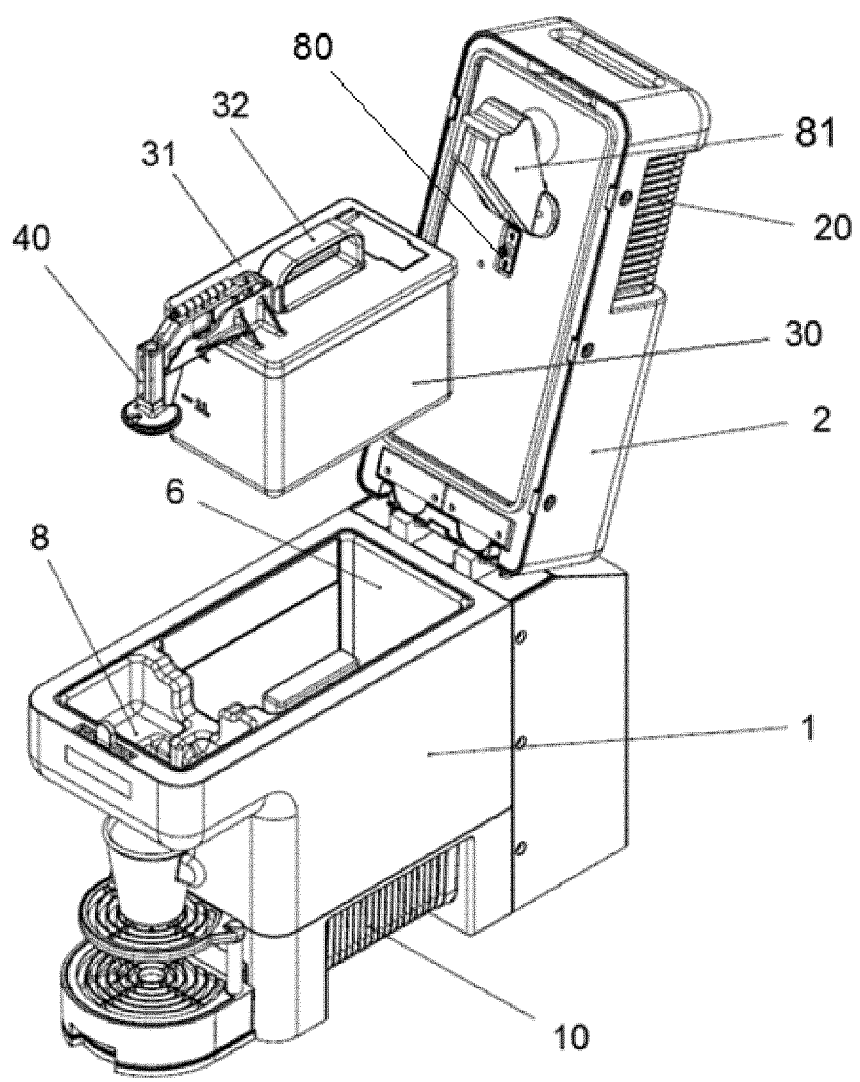
FIGS. 2a-b show detailed views of a fluid foaming machine according to the present invention, in an open position, showing the fluid container and its refrigeration in the machine.
Figure 2B:
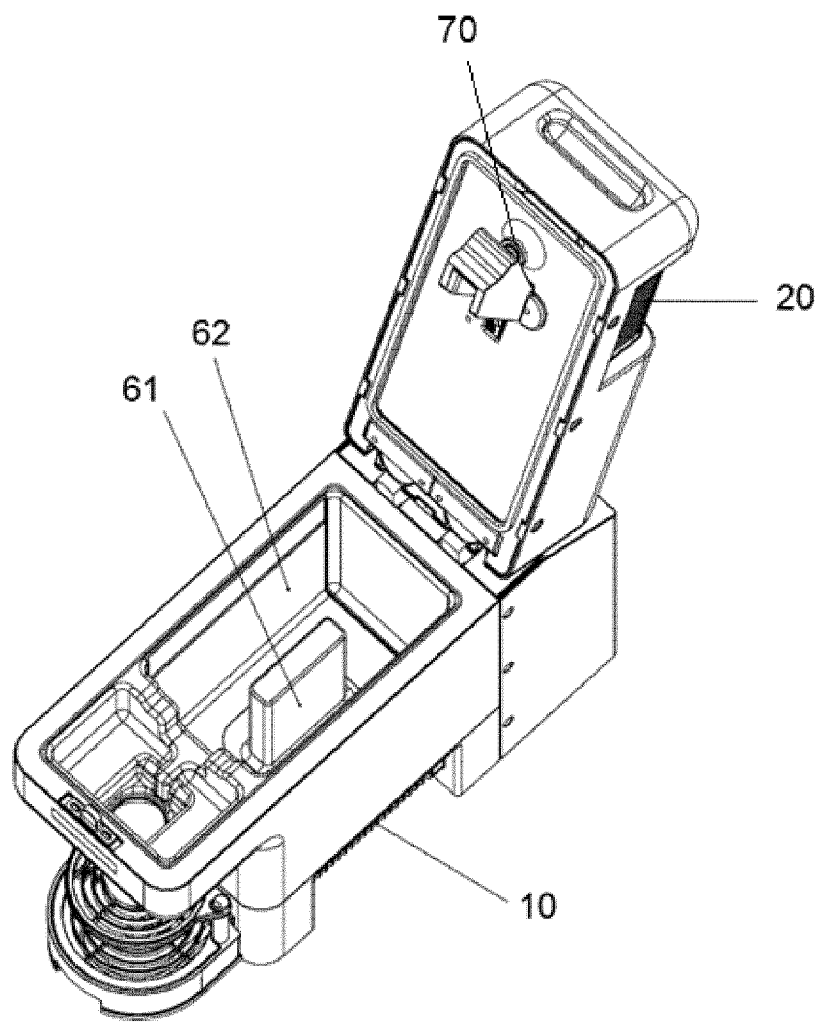

Referring now to FIGS. 2a and 2b, the insertion of the fluid container 30 together with the foaming device 40 is shown in detail. Typically, the fluid container 30 comprises a cover 31 with a handle 32 for allowing an easy insertion and removal of the mentioned container 30. FIG. 2b shows a second view with the primary refrigerated compartment 6 without the fluid container 30 having been inserted. In order to better cool the fluid, typically milk, the fluid container 30 comprises a cavity 33, typically arranged in the middle (see FIG. 3d or 3e for example) cooperating with a dedicated cooling block 61 in the primary refrigerated compartment 6 and connected to the first cooling unit 10. Furthermore, the cooling block 61 is welded together with a metallic sheet that covers the cooling walls 62 of the primary refrigerated compartment 6. This configuration allows a better and more homogeneous cooling of the fluid inside the fluid container 30. Preferably, the cooling block 61 is arranged centred in the primary refrigerated compartment 6, and so is the cavity 33 in the container 30: this configuration is particularly advantageous as it accelerates cooling of the fluid in the container 30 as it is done from the centre of the fluid towards the exterior of it.

FIGS. 3a to 3e show detailed views of the fluid container 30 in the machine 100 of the present invention, showing the container as such and the foaming device 40, the only parts that are in contact with the fluid and that have to be cleaned regularly, typically once a day. According to the invention, these components do not need an automatic rinsing system integrated into the machine, as they are completely removable and can be easily cleaned. Furthermore, according to the invention, the container assembly remains very simple, as the whole fluid system is permanently refrigerated.

Figure 3A:
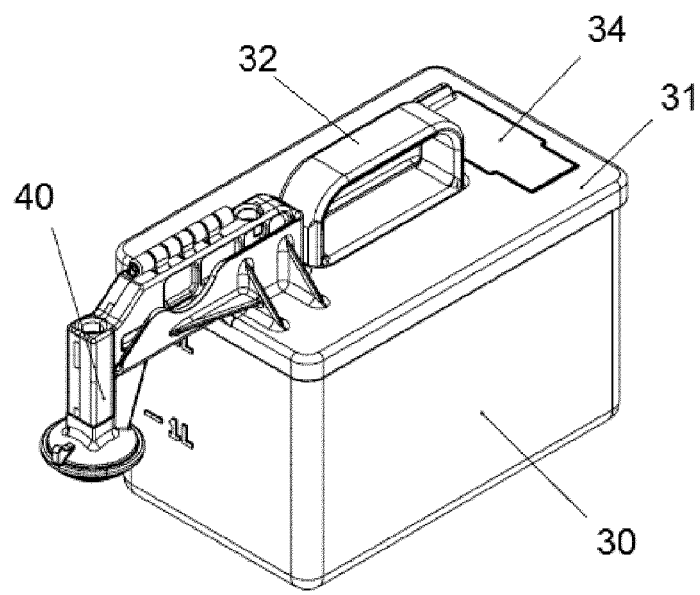
FIGS. 3a-e show different views of the fluid container together with the foaming device in a fluid foaming machine according to the present invention.
Figure 3B:
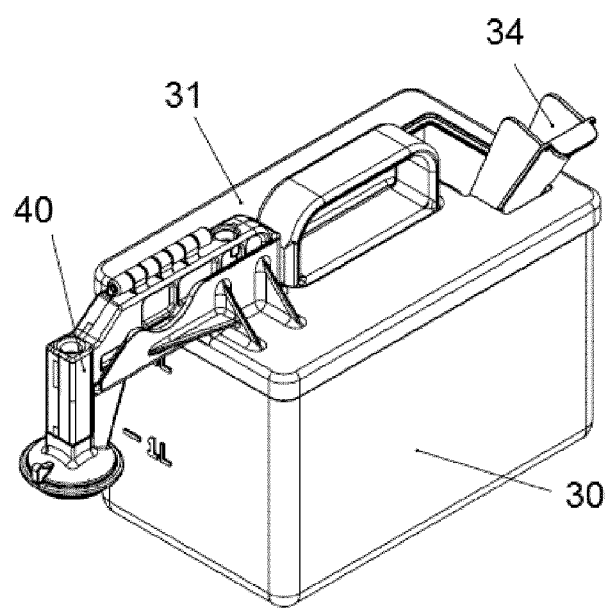

FIGS. 3a and 3b show the fluid container 30 with a top cover 31, a handle 32 and also comprising a filling inlet 34, typically arranged in the top cover 31, used for inserting fluid into the container 30 without removing the container from the machine. The top cover 31 is configured to hold and retain in place the foaming device 40.

Figure 3C:
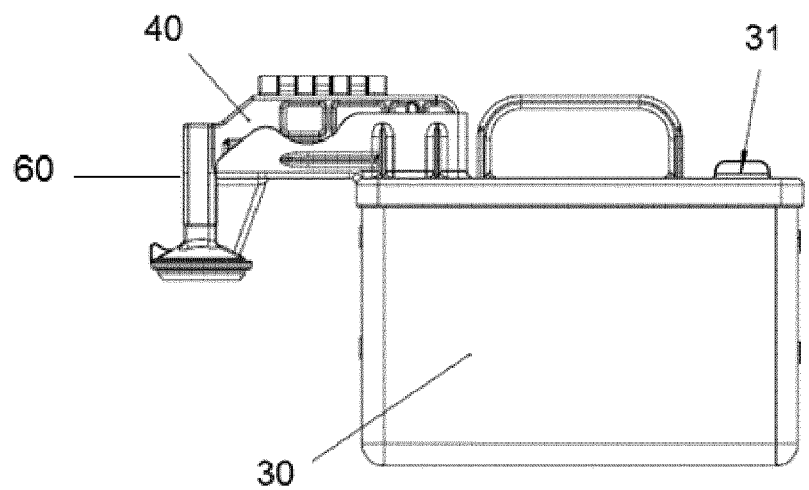
Figure 3D:
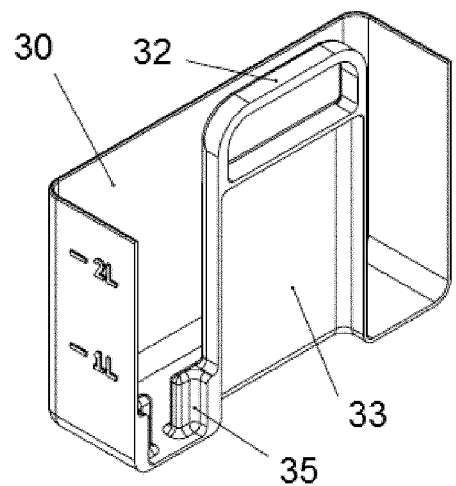

The cut view of the fluid container 30 in FIG. 3d shows the cavity where the cooling block 61 will be arranged, the handle 32 and an integrated guide part 35 for holding and retaining in place the foaming device 40.

Foaming in the machine 100 of the present invention takes place in the foaming device 40, where the fluid (typically milk) is sucked by Venturi effect through injection of steam by a steam pipe 21. Air is also added in a controlled manner through an air pipe 22 controlled by a solenoid valve 36 (comprising also electronics) arranged in the cover 31. By acting on the valve 36, it is possible to add air to the fluid in order to foam it, adding more or less quantity of air depending on the foaming characteristics targeted, or not to add any air at all. Once steam is not injected any more, the remaining fluid in the foaming device 40 flows back to the fluid container 30 and the remaining fluid film in this foaming device is acceptable as it is constantly cooled down no there are no hygienic problems.

Cleaning of the machine 100 of the invention is easy and only needs to be done for the fluid container 30 which can be easily removed from the machine, the cover 31 of said fluid container 30 and the foaming device 40 which is deployable and allows also an easy cleaning.

Figure 4A:
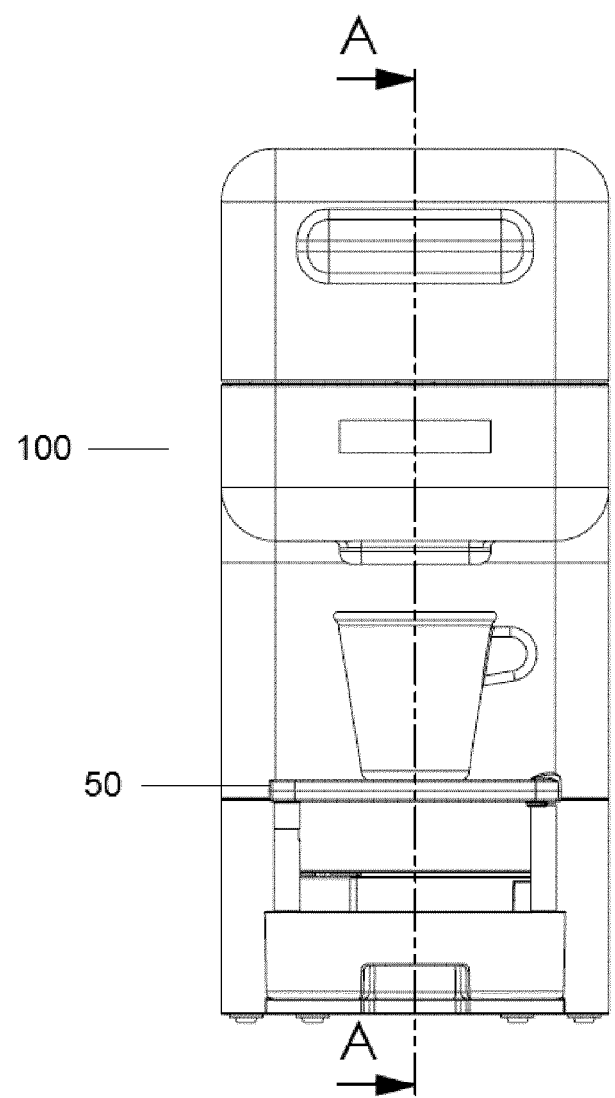
FIGS. 4a-b show a frontal view and a cut view, respectively, of a fluid foaming machine according to the present invention.
Figure 4B:
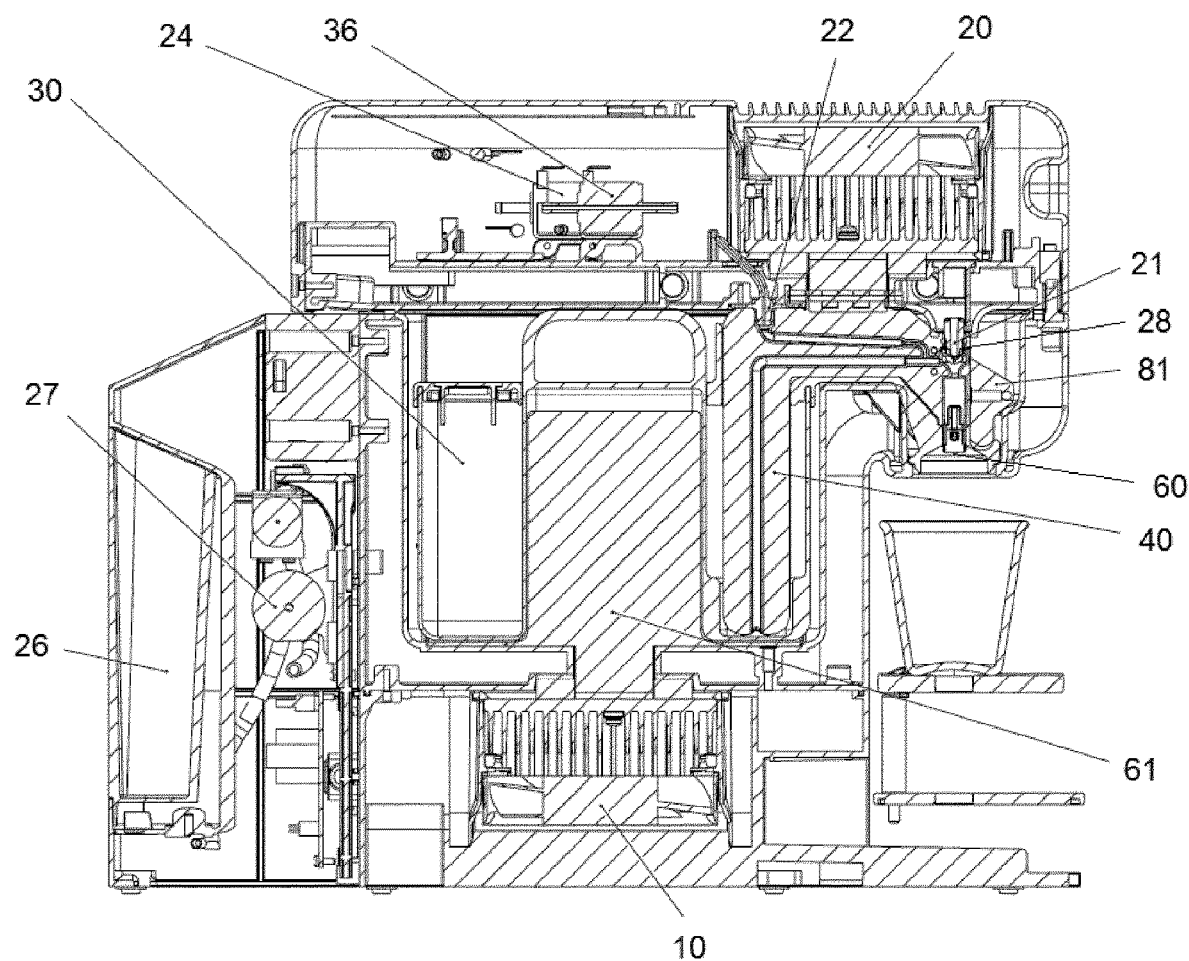

FIGS. 4a and 4b show a frontal and a cut view of the foaming machine 100 of the present invention. FIG. 4b shows the first cooling unit 10 intended to refrigerate the primary refrigerated container for the fluid (milk), and the second cooling unit 20 intended to refrigerate the secondary refrigerated compartment 8 where the foaming device 40 will be arranged. The fluid container 30 is also clearly shown in FIG. 4b where the fluid inside its volume is cooled by the cooling walls 62 and also by the cooling block 61 arranged within its cavity 33. As represented in the mentioned FIG. 4b, the foaming device 40 is in fact refrigerated by means of a metallic cooling block 81 arranged around the foaming device and refrigerated by the second cooling unit 20. This metallic cooling block 81 is also holding the foaming device 40 in place, assuring tightness and its permanent refrigeration. The foaming device 40 is shown having a connection to a steam pipe 21 and to an air pipe 22, through which steam and air are respectively injected.

In the foaming machine 100 of the invention, steam is generated by conventional known means: a watertank 26, a waterpump 27 and a thermoblock 28 connected to the steam pipe 21. A security valve 24 is also provided in the machine 100 acting on the opening and closing of the steam pipe 21. Similarly, as already disclosed, the air pipe 22 is connected to a solenoid valve 36 which controls the air injected in the foaming device 40: when only hot milk is desired (that is, no milk foam is targeted), the air entry is cut and only fluid goes through the foaming device, the fluid being then heated by means of the steam injected through the steam pipe 21.

According to different possible embodiments of the invention, it is also possible that the fluid can be heated by other means different from steam, for example using conduction, radiation (using infrared or halogen lamps, for example), hot air, induction, etc.

Figure 5:
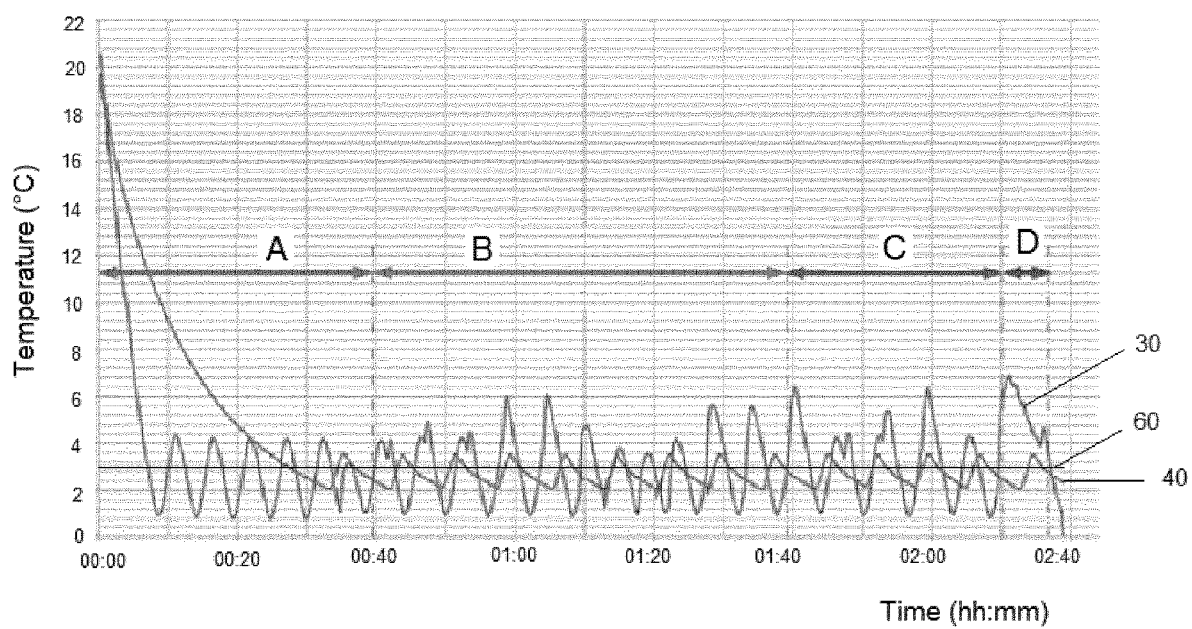
FIG. 5 shows a graph with the temperature evolution in the fluid tank and in the outlet nozzle in a fluid foaming machine according to the present invention.

Finally, the graph in FIG. 5 attached shows the temperature evolution of the fluid in the container 30 and the temperature evolution in the outlet nozzle 60. As it can be seen, in the first part A of this graph, corresponding to a cooling phase, the temperature of the fluid in the container is quickly reduced and the temperature in the outlet nozzle is maintained low, at around 4° C. maximum. Phase B in the graph shows the temperature evolution when 11 milk foams are done in the machine of the invention (one every 6 minutes, approximately): the temperature of the fluid in the container is maintained around 3° C. and the temperature at the outlet nozzle is raised when milk is foamed but goes down and decreases to a low temperature very quickly. Similarly, phase C shows temperature evolution when 5 long milk foams take place (also typically one every 6 minutes, approximately): again, the temperature at the outlet nozzle when increased due to the foaming decreases to a low temperature very quickly. Finally, phase D shows the temperature evolution after 6 long milk foams having taken place in a row, where the temperature at the outlet nozzle again decreases to a low temperature very quickly.

The mean temperature of the outlet nozzle 60 remains at around 3° C.; the temperature variation of the outlet nozzle 60 is due to the milk or milk foam preparations, where steam is injected into the foaming device 40. Once steam is interrupted (cut), the temperature of the foaming device is very rapidly going back to the fridge temperature (typically 4° C.) within about 2 minutes: this allows that no rinsing is needed as the remaining milk is permanently refrigerated up to the foam outlet. Further measurements showed that the milk foam or hot milk temperature is not increased as a consequence of steam injection. In other words, this graph shows that there is very small influence of the steam injected into the fridge temperature.

By the foaming machine 100 presented in this invention, simplified handling and cleaning of the parts involved with the fluid preparation (typically milk) is possible thanks to these parts being continuously refrigerated; therefore, complex cleaning and rinsing cycles are avoided.

As already described, the current invention aims to solve this problem, providing an easy cleaning and only of a few parts involved, also avoiding any rinsing cycles, by transferring the whole fluid (milk) foam preparation into a refrigerated area, so the cleaning procedure is reduced to a never reached simplicity. In fact, as the whole system is refrigerated, no rinsing of the remaining milk in the fluid system is needed. Furthermore, the foaming device proposed by the invention is also foldable and allows an easy cleaning under tap water or in the dishwasher for example. The milk foaming is done with steam that is injected into the last part of the foaming device 40. Once steam is cut, the temperature of the foaming device is rapidly going back to what is called fridge temperature (typically 4° C.) within a short time, of around 2 minutes. Therefore, no rinsing is needed, as the remaining milk is permanently refrigerated up to the foam outlet. Ideally, as a preferred embodiment of the invention, two cooling units are used, one for cooling the fluid tank (first cooling unit 10), and another one for cooling the foaming device (second cooling unit 20).

As an alternative and less expensive solution, the machine 100 of the invention can be configured such that it comprises no cooling unit (so the machine is made in fact with a reduced size) and the fluid container and the foaming device are refrigerated externally, in a refrigerator or outside unit: after each milk and/or foam preparation, the fluid container and the foaming device are introduced in an external refrigerator for cooling. Still, the same easy cleaning is possible as the removal of the fluid container and the deployment of the foaming device remain unchanged.

Figure 6A:
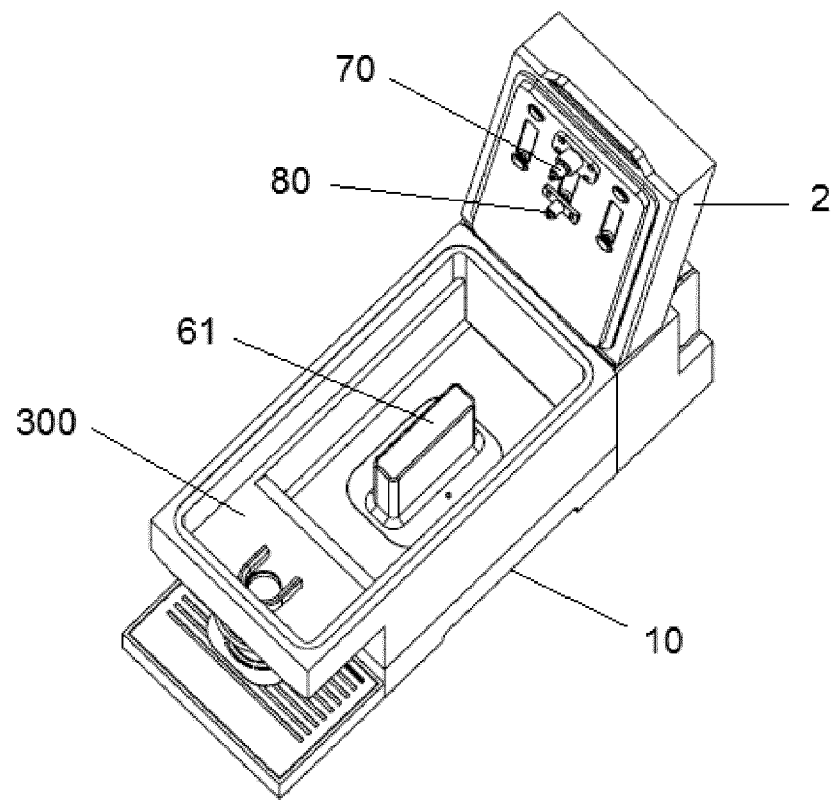
FIGS. 6a-c show different detailed views of a fluid foaming machine according to another possible embodiment of the present invention.
Figure 6B:
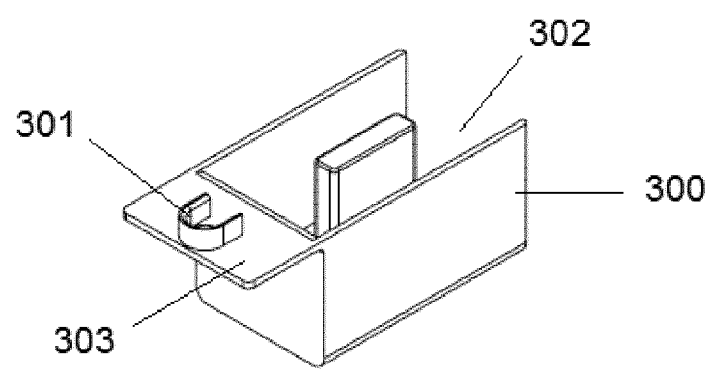
Figure 6C:
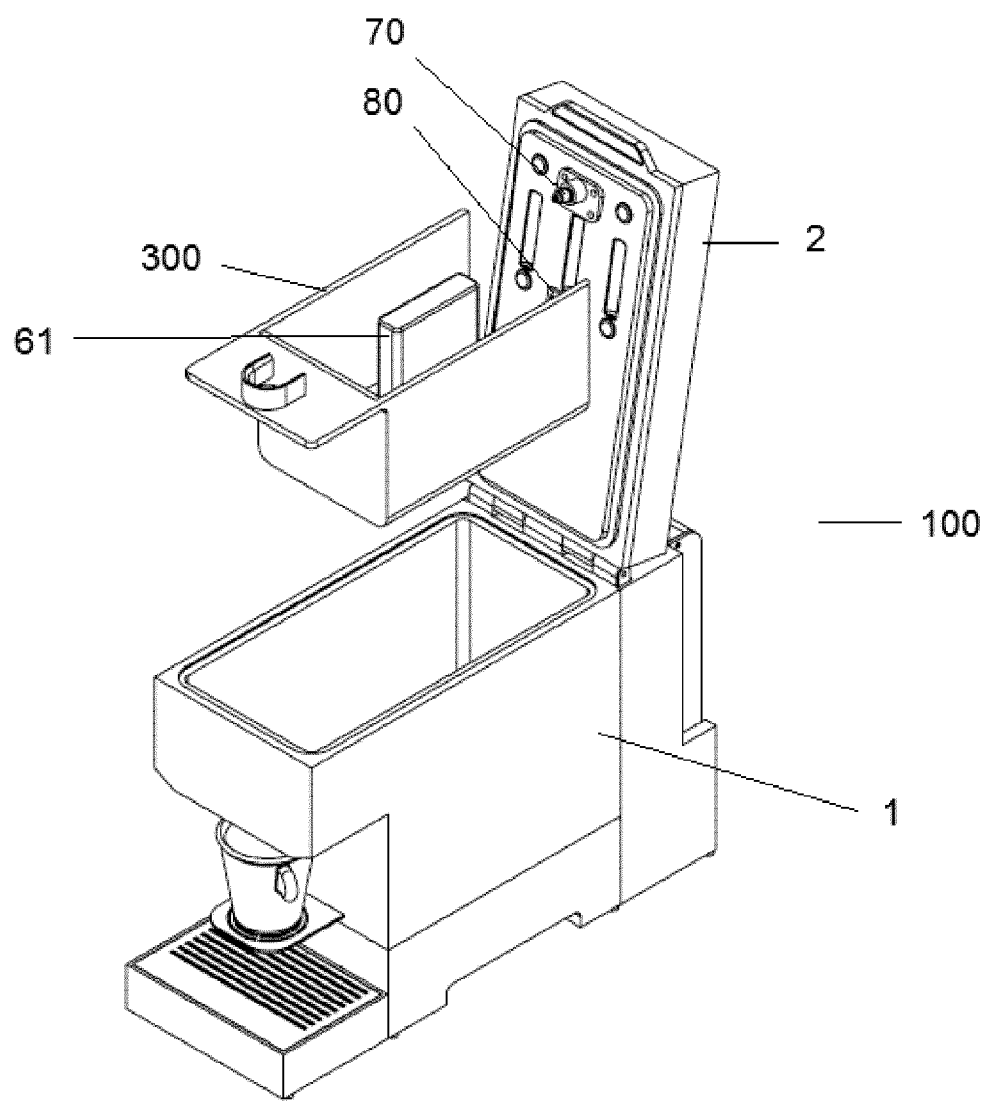

Another variant of the present invention is shown in FIGS. 6a, 6b and 6c attached. According to this variant, there is only one cooling unit 10 arranged in the low part of the housing 1 of the machine. This cooling unit actually cools a block 300 comprising an inner volume 302 where the container 30 with the fluid will be arranged and a wing part 303, also refrigerated, comprising an insert part 301 to receive the outlet nozzle 60 of the foaming device 40. Therefore, with this embodiment, only one cooling unit 10 is able to cool from below both the fluid in the container 30 and the foaming device 40 in its outlet. In a similar way, a cooling block 61 is also arranged in the inner volume 302 cooperating with the corresponding cavity 33 in the container 30. The top opening 2 of the machines, as represented in FIGS. 6a and 6c, comprises the steam entry 70 and the air entry 80 that are automatically connected to corresponding matching entries in the foaming device 40. As it is clear, the top opening 2 does not comprise now any metallic block 81, which also presents the advantage of making this top opening 2 much lighter. This embodiment of the invention comprises now only one compartment, inner volume 302, corresponding to the primary compartment 6 in the previous embodiment, where the fluid container 30 is arranged.

According to the invention, the air and steam entries are provided directly through the top opening 2 so direct automatic connection to the foaming device 40 is made by simply closing the top opening 2 of the machine. However, it is also possible and should be comprised within the scope of the present invention, that there are connections done manually by the user from the steam and air entries 70, 80 to the foaming device 40.

Figure 3E:
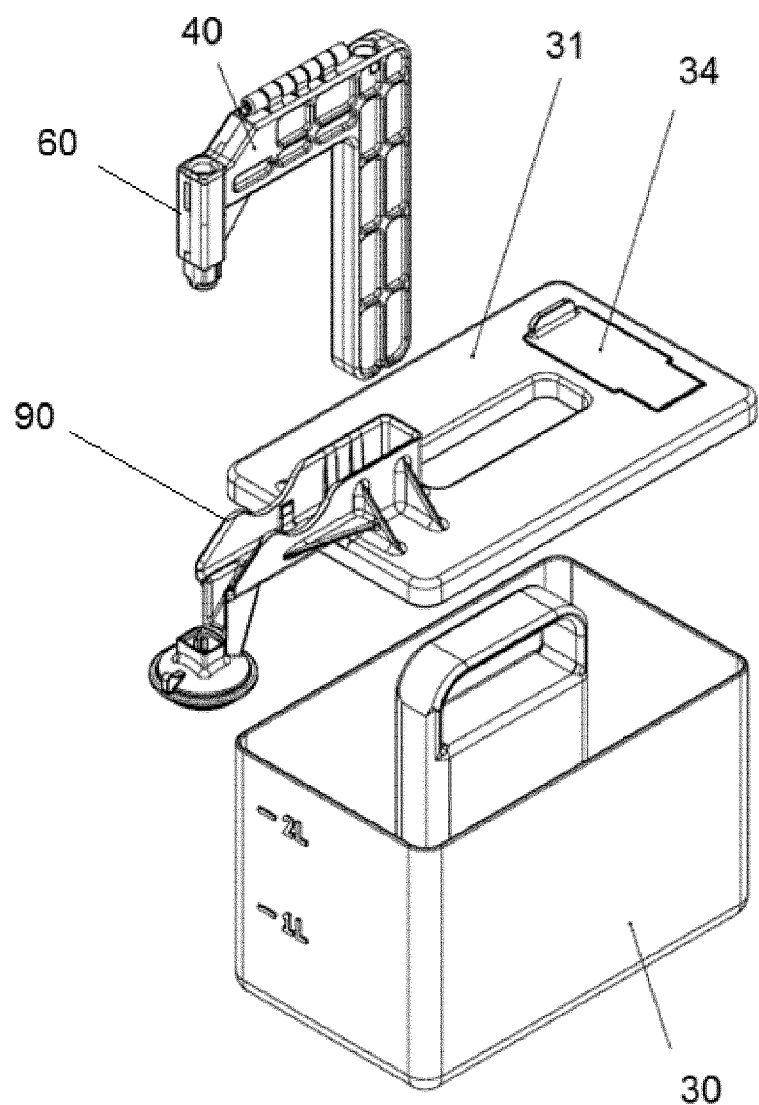

It is also important according to the invention that the foaming device is tightened when arranged at the foaming receiver 90, as shown in FIGS. 3c and 3e, for example. Tightness is indeed necessary for being able to suck fluid by Venturi effect from the fluid container 30 and let it pass through the outlet nozzle 60. Preferably, for obtaining this tightness, the foaming receiver 90 has a shape complementary to that of the foaming device 40.

Although the present invention has been described with reference to preferred embodiments thereof, many modifications and alternations may be made by a person having ordinary skill in the art without departing from the scope of this invention which is defined by the appended claims.

The invention claimed is:

1. A fluid foaming machine for producing foam, the fluid foaming machine comprising a fluid container where fluid is contained, and a foaming device through which the fluid flows and the fluid is heated and/or foamed,
the fluid foaming machine comprising at least two distinct cooling units configured to maintain permanently refrigerated both the fluid container and the foaming device during fluid preparation and during stand-by of the fluid foaming machine, the at least two distinct cooling units are configured to refrigerate the fluid container and the foaming device separately,
wherein a first cooling unit refrigerates a primary compartment where the fluid container is arranged, wherein the primary compartment comprises a first cooling block configured to cooperate with a cavity in the fluid container, and the primary compartment comprises cooling walls configured to refrigerate sides of the fluid container, and a second cooling unit refrigerates a second cooling block configured to contour and refrigerate the foaming device.

2. The fluid foaming machine according to claim 1 wherein the fluid container and the foaming device are removable from the fluid foaming machine.

3. The fluid foaming machine according to claim 1 comprising a top opening provided with an air entry and a steam entry configured to cooperate with corresponding air and steam entries in the foaming device when the top opening closes over the foaming device.

4. The fluid foaming machine according to claim 3 comprising at least one valve configured to control the air and/or steam entries in the top opening.

5. The fluid foaming machine according to claim 1 further comprising a heater configured to heat the fluid dispensed through the foaming device.

6. The fluid foaming machine according to claim 5 wherein the heater comprises a conduction and/or radiation and/or hot air and/or induction member.

7. A fluid foaming machine for producing foam, the fluid foaming machine comprising a fluid container where fluid is contained, and a foaming device through which the fluid flows and the fluid is heated and/or foamed,
the fluid foaming machine further comprising at least one cooling unit configured to maintain permanently refrigerated both the fluid container and the foaming device during fluid preparation and during stand-by of the fluid foaming machine, wherein the at least one cooling unit is configured to refrigerate a cooling block, the cooling block comprising an inner volume to receive the fluid container, and the cooling block comprising an insert part configured to receive the foaming device.

8. The fluid foaming machine according to claim 7 comprising two distinct cooling units configured to refrigerate the fluid container and the foaming device separately.

9. The fluid foaming machine according to claim 8 wherein a first cooling unit refrigerates a primary compartment where the fluid container is arranged, and a second cooling unit refrigerates a cooling block configured to contour and refrigerate the foaming device.

10. A fluid foaming machine for producing foam, the fluid foaming machine comprising a fluid container where the fluid is contained, and a foaming device through which the fluid flows and the fluid is heated and/or foamed,
the fluid foaming machine comprising at least one cooling unit configured to maintain permanently refrigerated both the fluid container and the foaming device during fluid preparation and during stand-by of the fluid foaming machine,
the fluid foaming machine comprising a foaming receiver at least partly shaped complementary to the foaming device so that the foaming device is tightened when arranged into the foaming receiver.

11. A fluid foaming machine for producing foam, the fluid foaming machine comprising a fluid container where fluid is contained, and a foaming device through which the fluid flows and the fluid is heated and/or foamed,
the fluid foaming machine comprising at least one cooling unit configured to maintain permanently refrigerated both the fluid container and the foaming device during fluid preparation and during stand-by of the fluid foaming machine, wherein the fluid container comprises a filling inlet through which the fluid can be inserted in the fluid container without removing the fluid container from the fluid foaming machine.

12. A fluid foaming machine for producing foam, the fluid foaming machine comprising a fluid container where fluid is contained, and a foaming device through which the fluid flows and the fluid is heated and/or foamed,
the fluid foaming machine comprising at least one cooling unit configured to maintain permanently refrigerated both the fluid container and the foaming device during fluid preparation and during stand-by of the fluid foaming machine, wherein the fluid container comprises an integrated guide part configured to receive the foaming device.

* * * * *